United States Patent [19]

Kajino et al.

[11] Patent Number: 5,379,111
[45] Date of Patent: Jan. 3, 1995

[54] LENS METER

[75] Inventors: Tadashi Kajino, Okazaki; Mikio Kurachi, Aichi, both of Japan

[73] Assignee: Nidek Co., Ltd., Aichi, Japan

[21] Appl. No.: 51,707

[22] Filed: Apr. 26, 1993

[30] Foreign Application Priority Data

| Apr. 30, 1992 | [JP] | Japan | 4-140173 |
| Jun. 10, 1992 | [JP] | Japan | 4-177589 |
| Jun. 10, 1992 | [JP] | Japan | 4-177591 |

[51] Int. Cl.$^6$ .............................................. G01B 9/00
[52] U.S. Cl. .................................... 356/124; 356/127
[58] Field of Search ............... 356/124, 125, 126, 127, 356/153

[56] References Cited

U.S. PATENT DOCUMENTS

| 4,609,287 | 9/1986 | Kohayakawa | 356/124 |
| 4,730,924 | 3/1988 | Allard et al. | 356/124 |
| 5,152,067 | 10/1992 | Kurachi et al. | 33/200 |
| 5,173,739 | 12/1992 | Kurachi et al. | 356/124 |
| 5,247,341 | 9/1993 | Kurachi et al. | 356/127 |

FOREIGN PATENT DOCUMENTS 60-17335A 1/1985 Japan.
61-200441 9/1986 Japan.

*Primary Examiner*—Hoa Q. Pham
*Attorney, Agent, or Firm*—Finnegan, Henderson, Farabow, Garrett & Dunner

[57] ABSTRACT

A lens meter projects measuring light onto a lens, detects the measuring light traveled through the lens at a light detecting element, and determines the optical characteristics of the lens on the basis of the detected data obtained from the light detecting element. The lens meter provides a display device for displaying the relation to adjust the lens to the optical axis of the measuring optical path, measuring mode selector device for selecting a measuring mode from a single focus lens measuring mode to a progressive focus lens measuring mode, a control device for measuring the lens at position measuring points distributed at predetermined intervals on the lens successively on a measuring optical axis and measuring the refractive power of the lens at each measuring point. A dislocation between a vertical standard line, on which a measuring position of the refractive power of the far viewing section, crossing a horizontal standard line on a progressive focus lens and passing through a geometrical center thereof is calculated based on the refractive power of the progressive focus lens at each measured position, and a measuring optical axis of the measuring optical path, and a movement conducting mark is displayed on the display device to conduct the measuring to the vertical standard line direction based on the calculated data.

16 Claims, 18 Drawing Sheets

LENS METER

BACKGROUND OF THE INVENTION

1. Field of the Invention

The present invention relates to a lens meter for measuring the optical characteristics of a lens including spherical refractive power, cylindrical refractive power, axial angle and prism quantity and, more particularly, relates to a lens meter for measuring the additive diopter of a lens.

2. Description of the Prior Art

A known lens meter, such as "Auto Lens Meter LM-870" proposed by the applicant of the present patent application, determines the optical characteristics of a lens including spherical refractive power, cylindrical refractive power, axial angle and prism quantity on the basis of results of measurement of the locus of measuring light transmitted through the lens by a photo-detecting device. This known automated lens meter is capable of operating in an additive diopter measuring mode and of measuring the additive diopter of a progressive focus lens. When measuring the additive diopter of a lens by this known lens meter, the far viewing section of the lens is measured, the lens meter is set for the additive diopter measuring mode, the measured data of the far viewing section is stored in a memory, the lens is shifted to position the near viewing section of the lens at the measuring position, the data of the near viewing section is measured when the operator decides that the near viewing is positioned at the measuring position, and the difference between the measured data of the far viewing section and that of the near viewing section is calculated to determine the additive diopter.

The respective positions of the far viewing section and the near viewing section in the lens are determined subjectively by the operator and the correctness of the determination is dependent on the perception and experience of the operator. Generally, as shown in FIG. 12; a catalog "RS-type soft progressing focus lens" of Teijin Lens Co. Ltd., a lens as manufactured is provided with marks indicating the respective positions of the far viewing section and the near viewing section.

Therefore, the respective positions of the far viewing section and near viewing section of the lens as manufactured can be fairly accurately determined for measuring the characteristics of the lens. However, these marks are easily erasable, the marks are erased when the framed lens is wiped for cleaning and concealed marks are difficult to recognize visually. Therefore, the accurate measurement of the lens requires a skillful expert operator. Furthermore, any objective data securing correct measurement is not available.

There is known a prism thinning process as a lens processing method, called Prismatic Thinning, Allégé processing and the like. The prism thinning process is for thinning a thickness of a progressive focus lens, particularly of a far viewing section of the progressive focus lens. In the method, as shown in FIGS. 13(a) and 13(b); a catalog "SEIKO P-1 Genius" of Hattori Seiko Co. Ltd., a plus-lens is applied with a down-prism process and a minus-lens is applied with an up-prism process, a progressive focus lens is thereby intended to have a thinner thickness, in any additive diopter. Since there is a tendency for a progressive focus lens to thicken and increase in weight than a standard lens, it is not comfortable to wear the framed progressive focus lens. To dissolve the above problem, mainly a far viewing section of a progressive focus lens is cut down to thin through the above a prism thinning process. Consequently, prism in a longitudinal direction of the lens of when person puts on his spectacles is included in the lens, though it is considered that the prism does not affect the lens on using.

A measuring point of a for viewing section of a lens commonly positioned, varying far lenses manufactured by each lensmaker, at an upper point about 6–10 mm from a geometric center of the lens, and the position can be determined by finding a distance from an optical center (prism=0) based of a prism quantity of the lens. Generally, the geometric center is infinitely equivalent to the optical center, the measuring point of a far viewing section can be therefore determined easily. However, after the prism thinning process, the geometric center is not equivalent to the optical center and the prism quantity is dislocated, so then a measuring point of far viewing section can not be determined.

The dislocation of the prism after a prism thinning process is generally determined according to an additive diopter, but the additive diopter is not still found when measuring a far viewing section. And it is necessary to adjust the dislocation of the prism in a right and a left lenses so that each sight through a right and a left lenses may become same. Accordingly, the dislocation of the prism can not be determined with only the additive diopter.

There may be further a case where the prism thinning process is not applied as an instruction by user and the lensmaker. Therefore, a measuring position of a far viewing section in a progressive focus lens, applied with the prism thinning process, can not be determined on the basis of only the prism quantity in a longitudinal direction of the lens.

Additionally, in a case of a progressive focus lens having a low power, there is a problem of incapable of measuring an additive diopter stability.

SUMMARY OF THE INVENTION

The present invention has been made in view of the foregoing problems and it is therefore a first object of the present invention to provide a lens meter capable of obtaining highly reliable measured data including the additive diopter of a progressive focus lens, even if applied with a special process such as prism thinning process.

A second object of the present invention is to provide a lens meter capable of obtaining highly reliable measured data including the additive diopter of a lens, even if the lens is a progressive focus lens with low power, and without necessity to depend on operator's experience.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a lens meter of this invention, for determining the optical characteristics of a lens on the basis of the locus of measuring light projected on the lens, transmitted through the lens and detected by a photo-detecting device, comprises a display means for displaying the relation to adjust the lens to the optical axis of the measuring optical system, measuring mode selector means for selecting a measuring mode from a single focus lens measuring mode to a progressive focus lens measuring mode, a control means for measuring the lens at position measuring points distributed at predetermined intervals on the lens successively on a measuring optical axis and measuring the refractive power of the lens at each measuring point, an calculating means for calculating, based on the refractive power of the progressive focus lens at each measured position, a dislocation between a vertical standard line, on which a measuring position of the refractive power of the far viewing section, crossing a horizontal standard line on a progressive focus lens and passing through a geometrical center thereof and a measuring optical axis of the measuring optical system, and a movement conducting mark displayed on the display means to conduct the measuring to the vertical standard line direction based on the data obtained through the calculating means.

In another aspect of the present invention, a lens meter comprises a measuring optical system through which the measuring light to measure the optical characteristics of the lens passes, an optical measurement position detecting means for detecting the measuring light passed through the the lens, an optical characteristics calculating means for finding the optical characteristics of the lens based on a detected signal obtained from the optical measurement position detecting means, a display means for displaying the optical characteristics information of the lens found by the optical characteristics calculating means, a mode selector means for selecting a measurement mode between single focus lens measurement mode and a progressive multifocal lens measurement mode, a low power lens judging means for judging, when the progressive multifocal lens measuring mode is selected and thereby the far viewing section measuring step starts, whether the lens is a low power lens based on the optical characteristics value found by the optical characteristics calculating mode, a first determining means for determining, if judged the lens is not low power lens by the low power lens judging means, the far viewing section based on a variation in additive diopter per unit movement distance in a vertical standard direction, and a second determining means for determining, if judged the lens is low power lens by the low power lens judging means, the far viewing section based on a variation in additive diopter per unit prism variation in the vertical standard direction.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DESCRIPTION OF THE PREFERRED EMBODIMENTS (General Construction)

Figure 1:
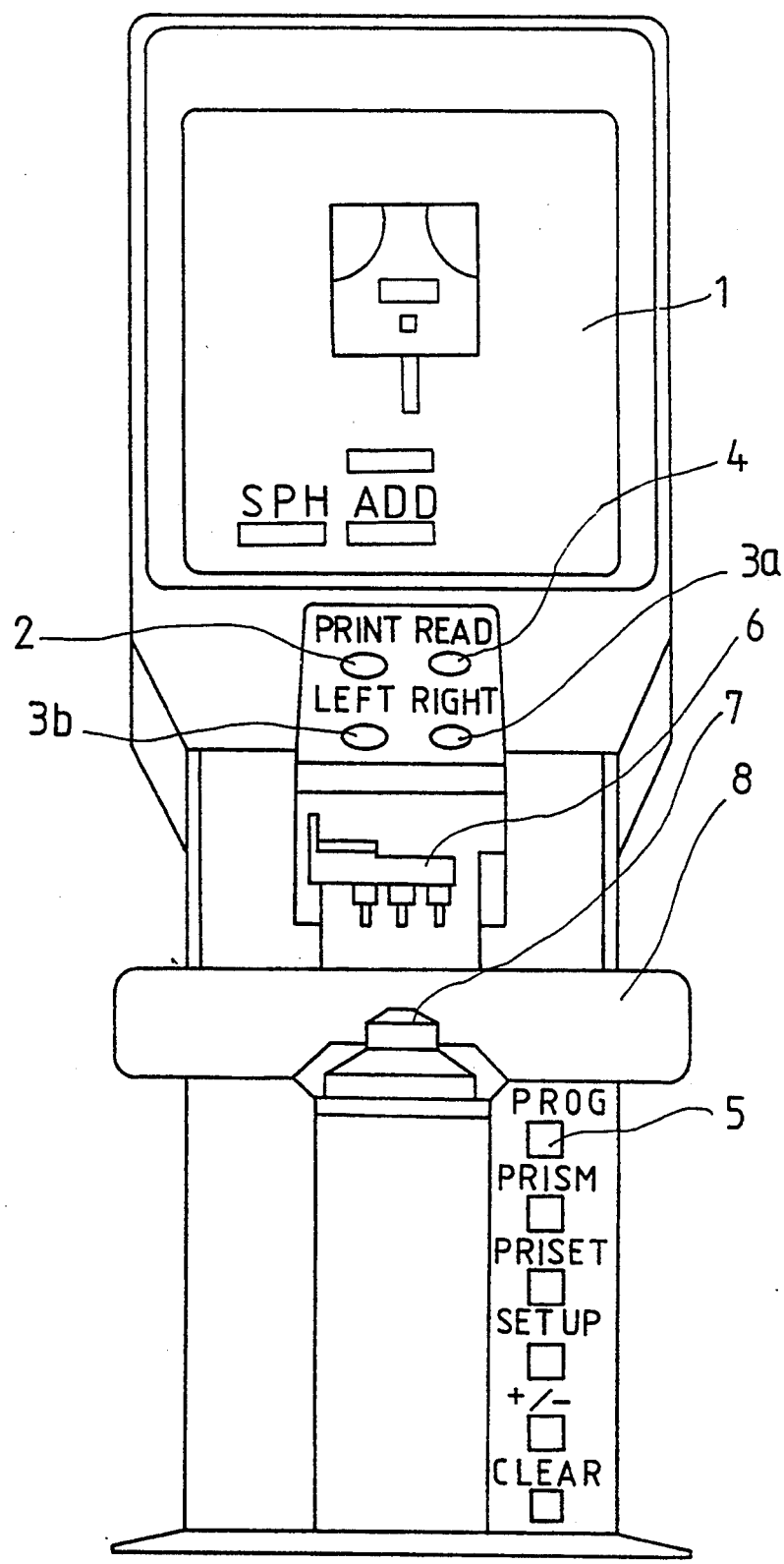
FIG. 1 is a front view of a lens meter in a preferred embodiment according to the present invention.

Referring to FIG. 1 showing a lens meter in a preferred embodiment according to the present invention, a display 1 displays a reticle indicating the optical axis of a measuring optical system, a positioning cross target and measured results when the lens meter is set for a measuring mode. In FIG. 1, an indicating mark in an additive diopter measuring mode, which will be described later, is displayed on the display 1. The lens meter is provided with a print button 2, which is pushed to print out measured data, lens selector buttons 3a and 3b, a read button 4, which is pushed to read measured data, a progressive focus lens measuring mode selector button 5, a lens holder 6, a nose piece 7 for supporting a lens L, a positioning plate 8 for determining a longitudinal position of the lens L.

(Refractive Power Measuring System)

A refractive power measuring system included in the lens meter will be described hereinafter.

Figure 2:
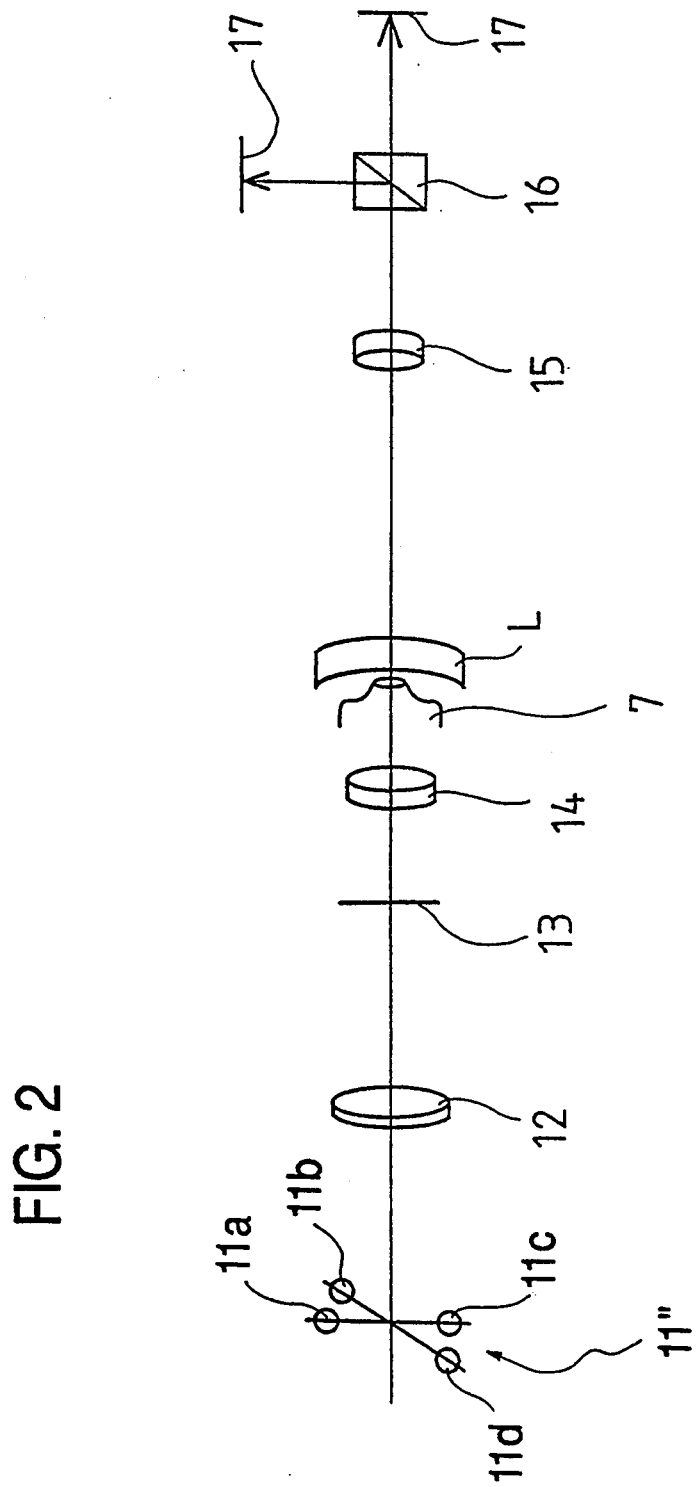
FIG. 2 is a diagrammatic view of a measuring optical system included in the lens meter of FIG. 1.
Figure 3:
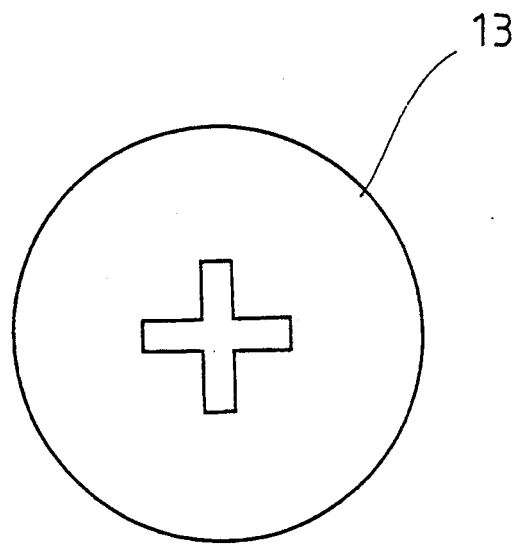
FIG. 3 is a front view of a target plate shown in FIG. 2, showing the shape of a slit formed in the target plate.

Referring to FIG. 2, four light emitting diodes (LEDs) 11' (11a, 11b, 11c and 11d) are disposed in a plane perpendicular to the optical axis of the refractive power measuring system and including the focal point of an objective lens 12. When the lens L is set on the nose piece 7, a microcomputer controls a LED driver to turn on the four LEDs 11a, 11b, 11c and 11d sequentially. The four LEDs 11a-11d are sequentially turned on by the LED driver repeatedly at predetermined intervals while the lens L is setting on the nose piece 7.

A measuring target plate 13 is provided with a crossing slits and disposed fixedly near the respective focal points of the objective lens 12 and a collimator lens 14. The four target images are blurred and dislocated by a distance proportional to the refractive power of the lens L, causing errors in the measurement. Accordingly, it is desirable to shift the target plate 13 to diminish the dislocation of the target images.

The nose piece 7 is disposed near the respective focal points of the collimator lens 14 and a focusing lens 15. Shown also in FIG. 2 are a half prism 16, and two linear image sensors 17 each comprising a plurality of photodiodes arranged in a linear array, and disposed perpendicularly to each other and to the optical axis.

Figure 4:
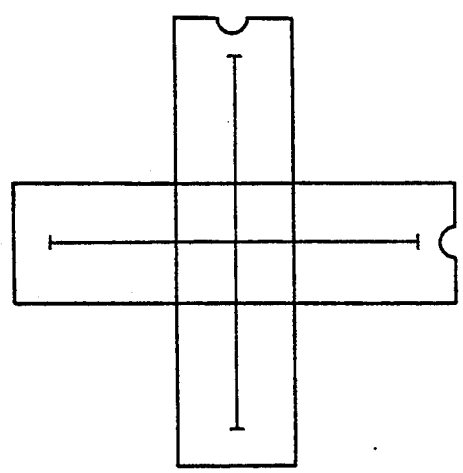
FIG. 4 is a view of a slit image formed on a photo-detecting device.

Light emitted by the LED 11' is refracted by the objective lens 12, collimated by the collimator lens 14, refracted by the lens L and focused by the focusing lens 15 on the two image sensors 17. Thus, the image of the crossing slits of the target plate 13 as shown in FIG. 4 are formed on the image sensors 17.

A relation between the refractive power of the lens L and a focusing position of a measuring target image will be briefly described.

The four LEDs 11' (11a-11d) are turned on individually to illuminate the target plate 13. If the lens L is not set on the nose piece 7, images of the crossing slits of the target plate 13 (hereinafter referred to as "target images") formed on the image sensors 17 by the light emitted by the LEDs 11a, 11b, 11c and 11d overlap each other.

If the lens L has only spherical refractive power, the target image is shifted on the imaging device by a distance corresponding to the spherical refractive power; the target image formed by the light emitted by the LED 11a or 11c is shifted along the line linking LED 11a to LED 11c, and the target image formed by the light emitted by the LED 11b or 11d is shifted along the line linking LED 11b to LED 11d.

If the lens L has only cylindrical refractive power, the lens L refracts the incident light in a direction perpendicular to the principal meridian (or parallel to the principal meridian). The cylindrical refractive power of the lens L can be calculated on the basis of the distance of shifting of the target image.

If the lens L has both spherical refractive power and cylindrical refractive power, the target image is shifted on the image sensors 17 by distances according to the spherical refractive power and cylindrical refractive power of the lens L.

Suppose that the respective coordinates of the respective centers of the target images formed respectively by the light emitted by the LEDs 11a, 11b, 11c and 11d are $A(x_a, y_a)$, $B(x_b, y_b)$, $C(x_c, y_c)$ and $D(x_d, y_d)$. Then, $$X_1 = |x_b - x_d| \quad (1)$$
$$X_2 = |x_a - x_c| \quad (2)$$
$$Y_1 = |y_a - y_c| \quad (3)$$
$$Y_2 = |y_b - y_d| \quad (4)$$
$$S = (X_2 + Y_2 \pm C)/2 \quad (5)$$
$$C = \sqrt{(X_2 - Y_2)^2 - 2(X_1^2 + Y_1^2)} \quad (6)$$
$$\theta = \tan^{-1}\sqrt{(X_2 - S)/(Y_2 - S)} \text{ or} \quad (7)$$
$$= \tan^{-1}\sqrt{(Y_2 - S)/(X_2 - S)}$$
$$PQ = \sqrt{\{(x_a + x_b + x_c + x_d)/4\}^2 + \{(y_a + y_b + y_c + y_d)/4\}^2} \quad (8)$$

where S is the spherical refractive power, C is the cylindrical refractive power, $\theta$ is the axial angle and PQ is the prism quantity.

A microcomputer 25 calculates the spherical refractive power, the cylindrical refractive power, the axial angle and the prism quantity of the lens L by using the coordinates of the target images formed by the light emitted by the LEDs 11a, 11b, 11c and 11d, and the expressions (1) to (8). If shifting the target plate 13, the above data will be corrected with the shifting distance.

(Control Circuit)

Figure 5:
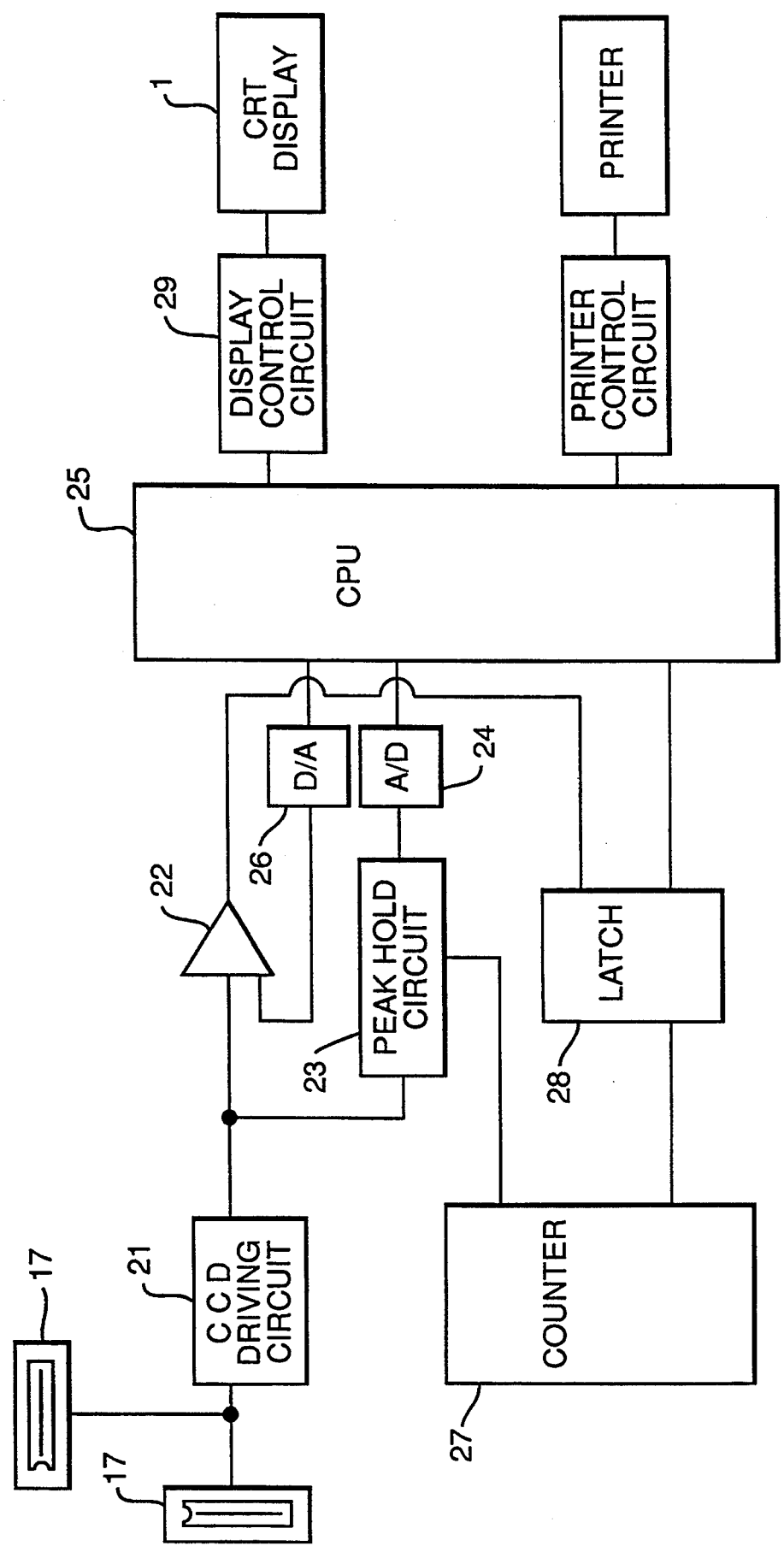
FIG. 5 is a block diagram of controlling the lens meter of FIG. 1.

Referring to FIG. 5, signals provided by the two image sensors 17 are transferred through a CCD driving circuit 21 to a comparator 22 and a peak hold circuit 23.

A peak voltage detected by the peak hold circuit 23 is converted into a corresponding digital peak signal by an A/D converter 24, and the digital peak signal is given to the microcomputer 25, the digital peak signal corresponding to the peak voltage detected by the peak hold circuit 23 is transferred through the microcomputer 25 to a D/A converter 26, the D/A converter 26 converts the digital peak signal into a half voltage signal corresponding to half the peak voltage, and then the half voltage signal is given to the comparator 22. The comparator 22 compares the half voltage signal with a signal given directly thereto by the CCD driving circuit 21 and provides a strobe signal. When the strobe signal is provided by the comparator 22, a signal provided by a counter 27 is given to a latch 28. The position of a shading edge is determined from the waveform, the microcomputer 25 determines the coordinates, and then the microcomputer 25 calculates the optical characteristics of the lens L on the basis of the coordinates.

The microcomputer 25 processes the position data, and then a display control circuit 29 controls the display 1 to display the processed position data together with data stored in the memory in characters and graphs.

(Operation)

Operation of the lens meter in a measuring mode for measuring the optical characteristics of a single-focus lens will be described.

When measuring the spherical refractive power, cylindrical refractive power and axial angle of a lens, a reticle is displayed on the CRT display 1, of which a center point is positioned on an optical axis of the refractive power measuring system. The LEDs 11a-d of the measuring optical system are turned on at predetermined intervals and the lens is mounted on the nose piece 7. Then, the refractive power on the measuring optical axis is calculated and displayed on the CRT display 1. The dislocation of the lens is calculated on the basis of the prism quantity (Formula of Plentis). In a display control circuit 29, the target image is superposed on the reticle on the CRT display 1 at a position corresponding to the dislocation. Measured data obtained when the reticle and the target image meet a predetermined positional relation represents the optical characteristics of the lens.

The operation of the lens meter in a measuring mode for measuring the optical characteristics of framed progressive multifocal lens will be described hereinafter.

Figure 6A:
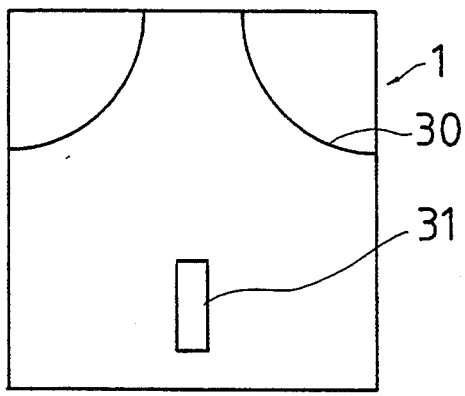
FIG. 6(a) through FIG. 6(e) are picture views showing respectively a picture displayed on a display 1.

The progressive focus lens measuring mode selector button 5 is depressed to select a measuring mode for measuring the optical characteristics of framed progressive multifocal lens. Before a lens is put on the nose piece 7, as shown in FIG. 6(a), two curves 30 and a longitudinal rectangular target 31 indicating a measuring point are displayed on the display 1. The two curves 30 imitate a progressive section or band, and are displayed fixedly on the display 1.

Either the right lens selector button 3a or the left lens selector button 3b is depressed to specify a lens to be tested. A selected lens is put on the nose piece 7, and then the positioning plate 8 is brought into contact with the lower end of the lens. The lower or upper ends of the lens means that in a longitudinal direction of the lens of when person puts on his spectacles.

The position of the lens is adjusted so that a section of the lens which is supposedly the far viewing section of the framed lens, a little to the upper end of the lens, is positioned on the nose piece 7 to start a far viewing section measuring step. Referring to FIG. 6(b), a marker 32, flashing on and off at a lower position on the display 1, indicates a mark to move the target 31. And an operator can find the movement distance and direction of the lens based on a position of the target 31 to the marker 32. The far viewing section of the progressive multifocal lens is positioned on the standard longitudinal axis mentioned above, the marker 32 indicates the position of the standard longitudinal axis accordingly.

Based on the measured data representing the refractive power of the far viewing section, it is judged whether the far viewing section is low power lens. Namely, the refractive power data (S, C, A) is first factorized into each component of X-Y coordinate described hereinafter. If the X or Y component, where the X component is $S + C\sin^2 \theta$ and the Y component is $S + C\cos^2 \theta$, is less than a predetermined reference value, particularly 0.75 D in the present embodiment, the lens is judged to be a low power lens.

Case (A) of the lens being not low power lens.

If judged that the lens is not a low power lens, the target 31 is displayed at a position determined according to the following.

If the lens is a spherical lens, a direction and distance from the standard longitudinal axis is found on the basis of the prism value in a lateral direction at each measuring point. Accordingly, the target 31 is displayed at a position indicating a relative position of each measuring point to the marker 32.

If the lens is an astigmatic lens, the prism value of the lens in a lateral direction is 0 on the astigmatic axis. By offsetting influence caused by the astigmatic lens, the prism value at each measuring point is corrected into data representing a distance and direction from the standard longitudinal axis. The above method may be utilized for processing all progressive focus lens because spherical lens is considered to be a special astigmatic lens representing C=0.

In one astigmatic lens including each value of S, C, A, the prism quantity ($P^x$, $P^y$) at A point (x, y) on X-Y coordinate is as follows, putting the optical center of the lens at "0", the standard longitudinal axis in Y-axis:

$$P^x = -(D^{xx} \cdot x + D^{xy} \cdot y) \quad (1)$$

$$P^y = -(D^{yx} \cdot x + D^{yy} \cdot y) \quad (2)$$

and the prism quantity ($P^{xo}$, $P^{yo}$) at B point (0, y) is as follows:

$$P^{xo} = -D^{xy} \cdot y \quad (3)$$

$$P^{yo} = -D^{yy} \cdot y \quad (4)$$

provided that
$D^{xx} = S + C\sin^2 \theta$,
$D^{yx} = -C\sin \theta \cdot \cos \theta \ (=D^{xy})$,
$D^{yy} = S + C\cos^2 \theta$,
where C read as minus.

Based on the above formula, the following formula is obtained $$P^{xo} = D^{xy} \cdot (P^y \cdot D^{xx} - P^x \cdot D^{yx})/(D^{xx} \cdot D^{yy} - D^{yx} \cdot D^{xy})$$

and a position at x=0 and a target displaying position are respectively determined by offsetting $P^{xo}$ from $P^x$.

The offset calculation is also utilized to observe a position of the lens described hereinafter.

Figure 6D:
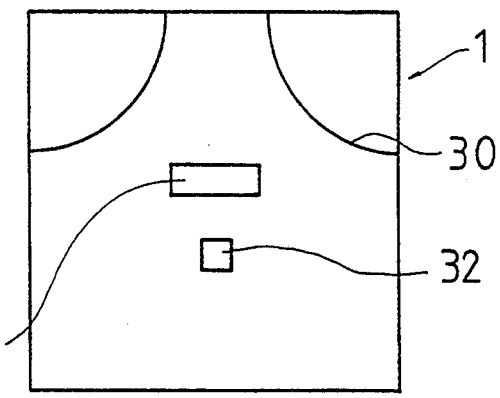
Figure 6B:
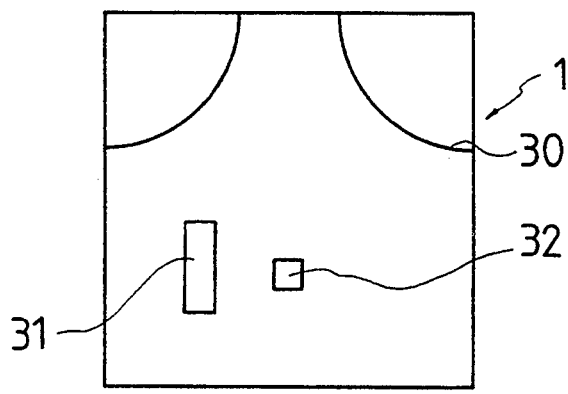
Figure 6E:
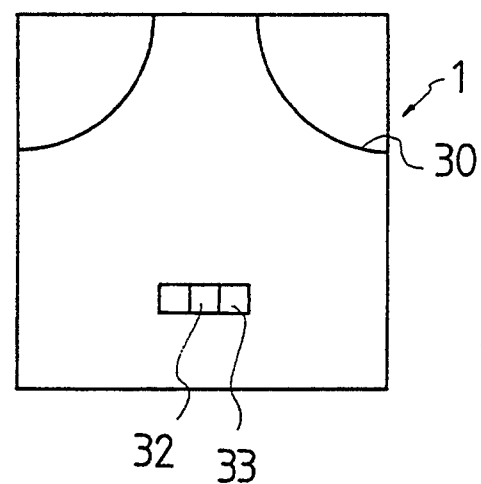
Figure 6C:
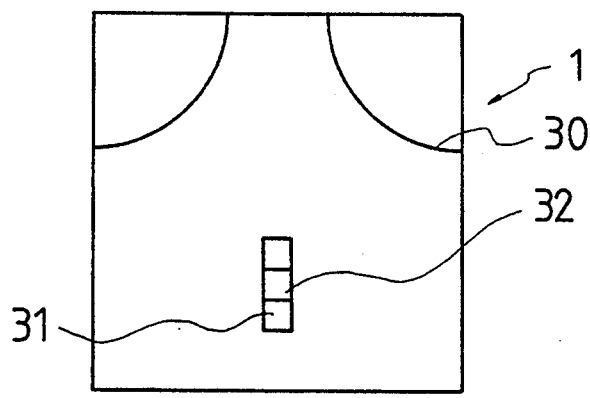

The lens is moved by the operator so that the target 31 may be superposed on the marker 32 as shown in FIG. 6(c), data "a" representing the refractive power at the position are stored in the memory.

When superposed on the marker 32, the target 31 is replaced with a lateral rectangular target 33, and the target 33 is displayed above the marker 32 on the display 1, referring to FIG. 6(d). Then the lens is moved so that the target 33 indicating a measuring point may be superposed on the marker 32 as shown in FIG. 6(e). The target 33 is controlled so as to be superposed on the marker 32 when the lens is moved by a calculated distance based on the prism value in a longitudinal direction of the lens. The data "b" representing the refractive power at a position, where the target 33 agreed with the marker 32, is stored in the memory.

By comparing respective spherical refractive power between the data "a" and "b" representing the refractive power stored in the memory, it is judged whether the present measuring point is on a progressive focus section or on near the far viewing section outside the progressive focus section. Namely, if a difference between the data "a" and "b" is within a predetermined value (equal to approximately 0), it is judged that the measuring point is near the far viewing section. If the difference is not within the predetermined value to the contrary, it is judged that the measuring point is (or may be) in the progressive focus section.

(A-1) A case judged that the measuring point is near the far viewing section of the lens which is not low power lens will be explained as follows.

Figure 7A:
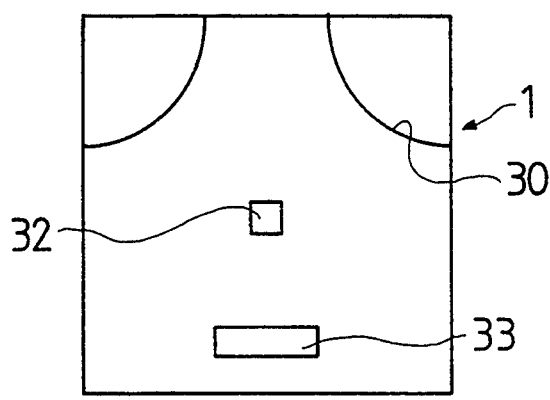
FIG. 7(a) through FIG. 7(g) are another picture views showing respectively a picture displayed on a display 1.

In the case that the measuring point is near the far viewing section, the marker 32, showing only the moving direction of the target 33, is displayed above the target 33 as shown in FIG. 7(a). The lens is moved by the operator, toward the operator in FIG. 7, so that the target 33 is moved toward the marker 32 on the display 1. The refractive power of the lens is measured sequentially during moving the lens, and the microcomputer 25 converts the prism quantity into the movement distance of the lens and detects variations in additive diopter per unit movement distance.

Figure 7B:
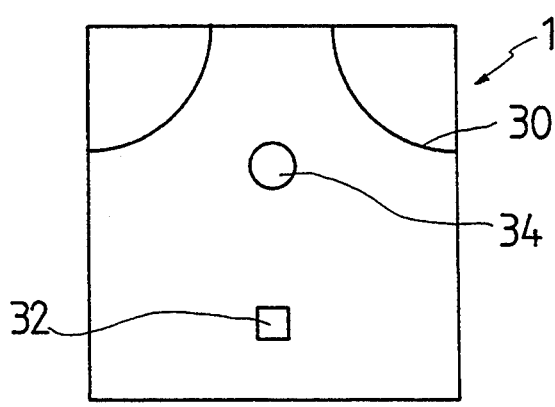

On detecting that a measuring position is shifted to the progressive focus section, based on the variation in additive diopter per unit movement distance, the target 33 is replaced with a circular target 34, then the marker 32 is displayed below the target 34, referring to FIG. 7(b). The progressive focus section may be detected where a spherical refractive power value is larger by a regular value (for instance 0.12 D) than the spherical refractive power of the data "b" representing the refractive power.

A distance from the start position of additive diopter varies according to a kind and an additive diopter of progressive focus lens. Commonly, in progressive focus lens on the market, an upper part by about 4–8 mm from the start position of additive diopter corresponds to the far viewing section designated by each lensmaker. When a movement distance of the lens is calculated based on the measured prism quantity in a longitudinal direction of the lens, and based on the data, the lens is moved by a predetermined distance, 6 mm in the present embodiment; the target 34 is displayed superposed on the marker 32.

In this embodiment, noting that the far viewing section is provided with a wide area, the lens is moved by a regular distance from the measuring point detected on the progressive focus section to simplify the operation.

It is also possible to move the lens on the basis of a position where a spherical refractive power is larger by a regular quantity than the refractive power "b".

Figure 7C:
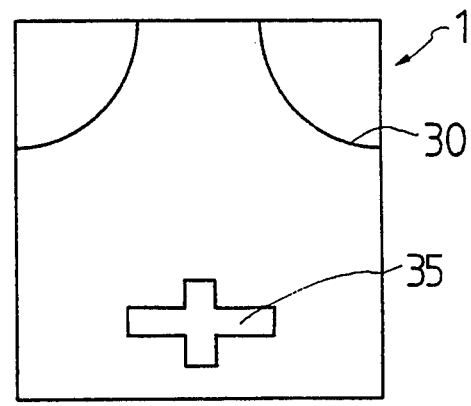

On receiving a signal that the lens is moved by a predetermined distance, referring to FIG. 7(c), the marker 32 is converted to a cross marker 35 by which an agreement of the target 34 with the marker 32 is recognized. A stable measured data at the measuring point in the far viewing section is detected and stored in the microcomputer 25.

Figure 7D:
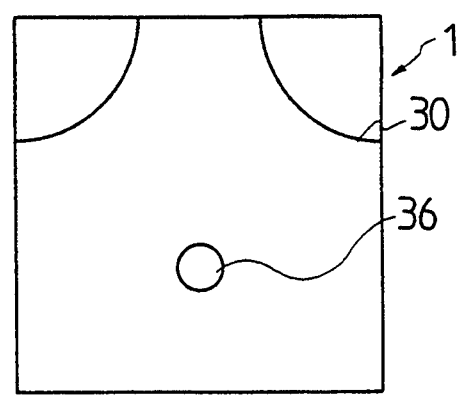

After stored the measured data in the far viewing section in the microcomputer 25, a near viewing section measuring step starts automatically, referring to FIG. 7(d). Such automatic shift of measuring mode from the far viewing section measuring step to the near viewing section measuring step prevent dislocation of lens caused by shift with a selector button. The near viewing section measuring step starts from moving a target 36 to the upper side on the display 1, namely by moving a measuring point to the lower side on the lens. The target 36 is moved on the basis of a movement distance reduced from the prism quantity in a longitudinal direction of the lens, imaging that a measuring point moves in the progressive focus section.

In a case of reducing a variation in the prism quantity to a movement distance, measuring error is often caused at a small refractive power. Therefore, when a refractive power is less than a predetermined reference value, for example less than 0.5 D, the movement distance is determined on the basis of the increase of additive diopter. The same process can be also applied for a lens of which prism variation is disordered.

The additive diopter is measured sequentially while the target 36 moving in the progressive focus section, and the measured data is displayed on an indicator 37, and also on a bar graph 38. These indications on the indicator 37 and the bar graph 38 enable the operator to find a rough additive diopter and the variation, even before the near viewing measuring step is completed.

Figure 7E:
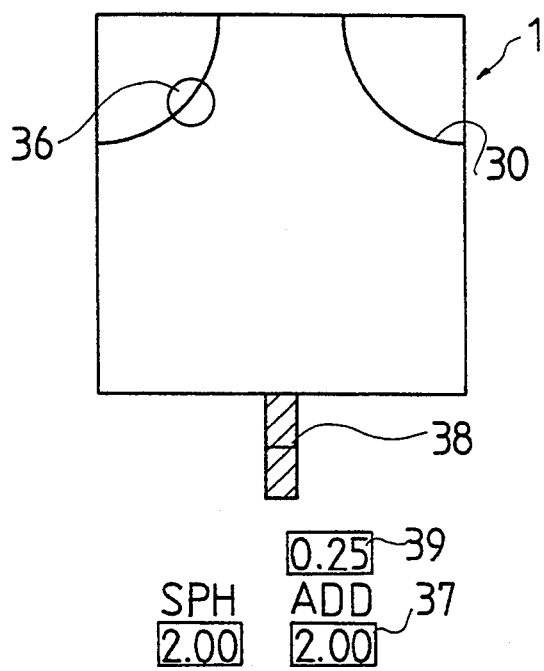
Figure 7G:
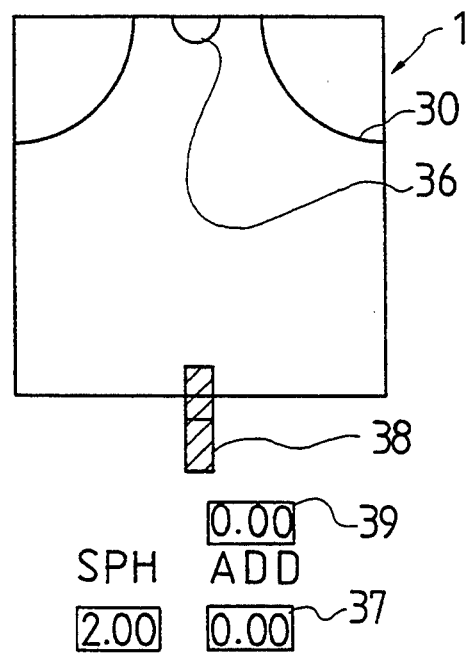
Figure 7F:
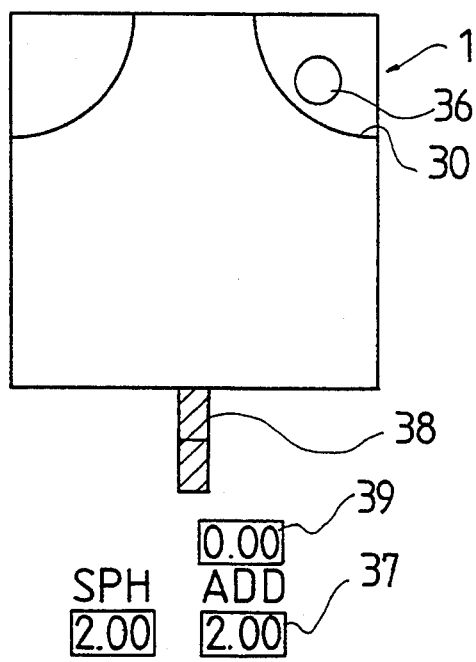

A difference between a cylindrical refractive power at a measuring point and the same at a far viewing section is detected, and converted to a numerical value to be displayed on an indicator 39 as optical distortion quantity. Based on the numerical value displayed on the indicator 39, it is monitored whether the measuring point exceeds a predetermined reference value, for example 0.25 D, from the progressive focus section. If exceeded the predetermined reference value, the measured value is cancelled, and the direction and the dislocation quantity of the measuring position are found from a prism value in a lateral direction of the lens simultaneously. Then the target 36 is displayed at a position outside the progressive focus section as shown in FIGS. 7(e) and 7(f).

Measuring errors in a lens of which the refractive power is lower will be corrected on the basis of variations in optical distortion quantity with a movement of the lens by the operator, namely of whether the optical strain quantity increases according to the movement of the lens. The movement distance of the lens is determined based on data including variations in prism quantity. The same process can be also applied for a lens of which prism variation is disordered.

As mentioned above, the additive diopter is measured through the near viewing section to lower end of the framed lens. And when the target 36 is positioned at approximately center between two curves 30 as shown in FIG. 7(g), the near viewing section measuring step is completed.

The variation in additive diopter near the near viewing section become slow, not constant.

Then a measured value at a position where a variation in additive diopter per unit movement distance is lower than a regular reference value and within a predetermined distance from the far viewing section (within about 18–25 mm distance from the far viewing section, lens makers indicate commonly a distance from an eyepoint, and the distance may be from a progressing start point), is rounded off to 0.25 D unit (=present unit refractive power of progressive focus lens), and estimated to be an additive diopter of the near viewing section. The regular reference value may be indicated with an absolute value, and more precise with the proportion of variation to the maximum variation of the additive diopter. The near viewing section measuring step is completed on finding the estimated refractive power of the near viewing section and the measured data within a predetermined diopter, ±0.05 D in the first embodiment. Therefore, the additive diopter of the near viewing section can be automatically found.

Figure 8A:
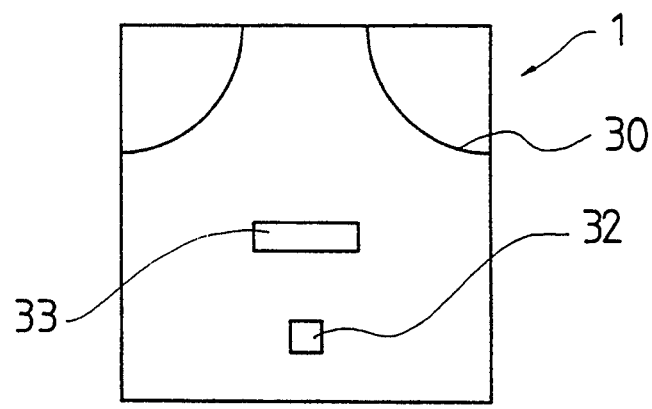
FIG. 8(a) and FIG. 8(b) are another picture views showing respectively a picture displayed on a display 1.

(A-2) In the case that the measuring point is in the progressive focus section, the target 33 is displayed above the marker 32 as shown in FIG. 8(a). The lens is moved so that the target 33 is moved toward the marker 32 on the display 1. The refractive power of the lens is measured sequentially daring moving the lens, and the microcomputer 25 converts the prism quantity into movement distance and detects a variation in additive diopter per unit movement distance.

Figure 8B:
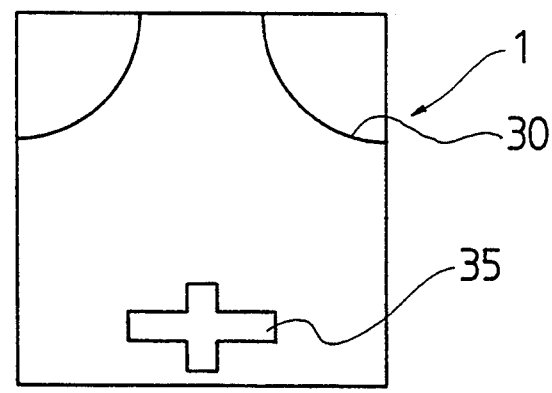
Figure 9A:
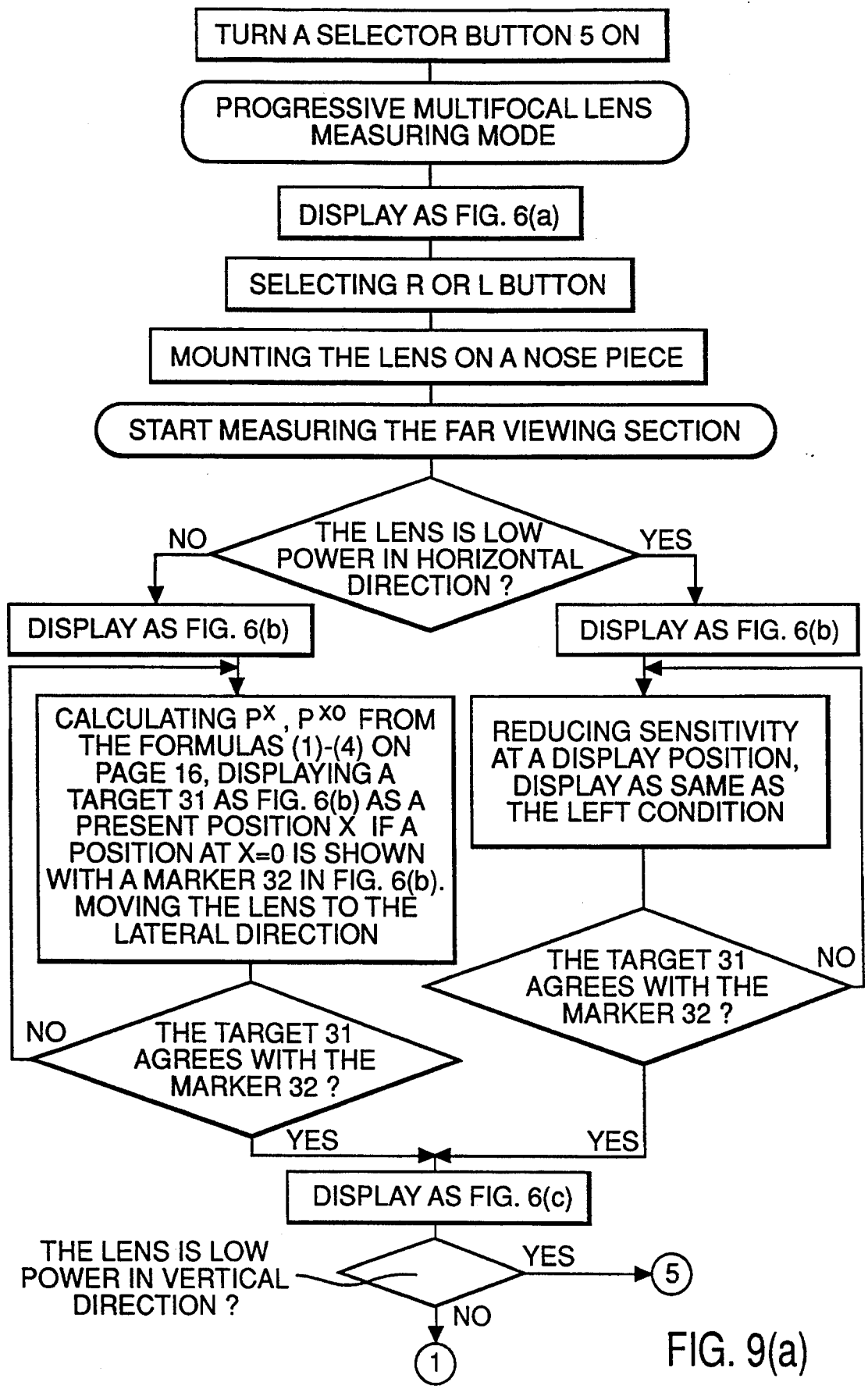
FIG. 9(a) through FIG. 9(f) are flow charts explaining a series of steps of an additive diopter measuring procedure.
Figure 9B:
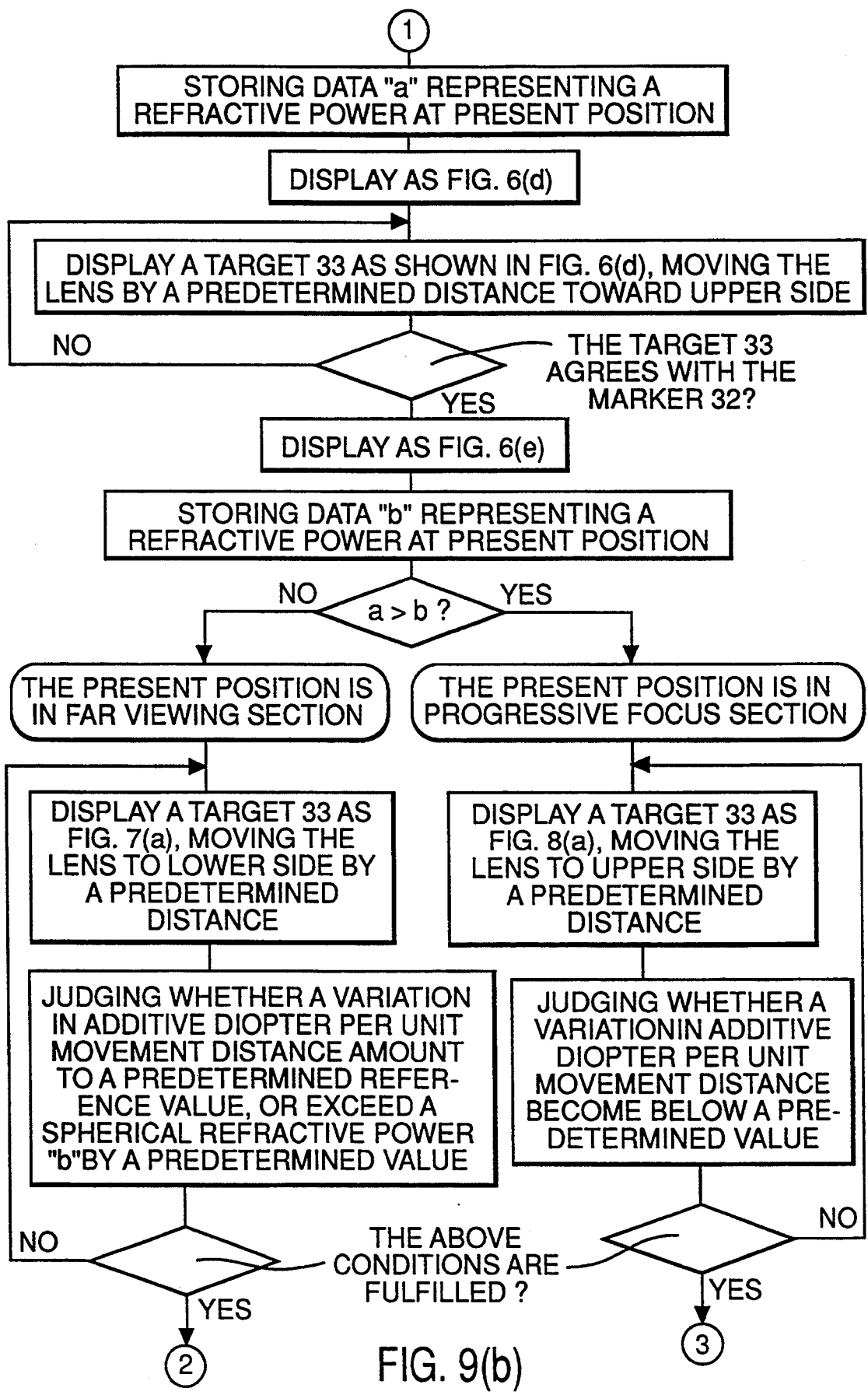
Figure 9C:
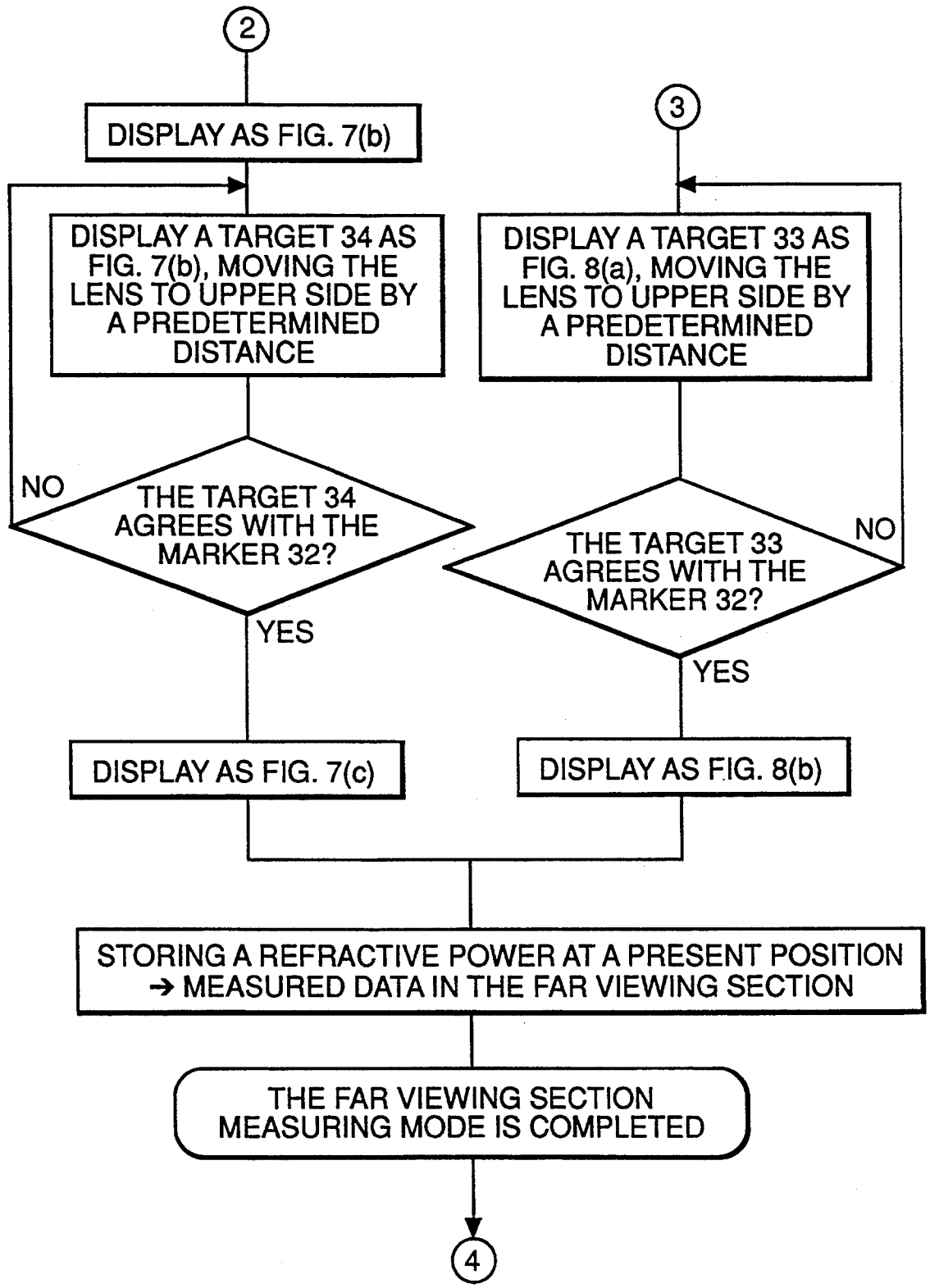
Figure 9D:
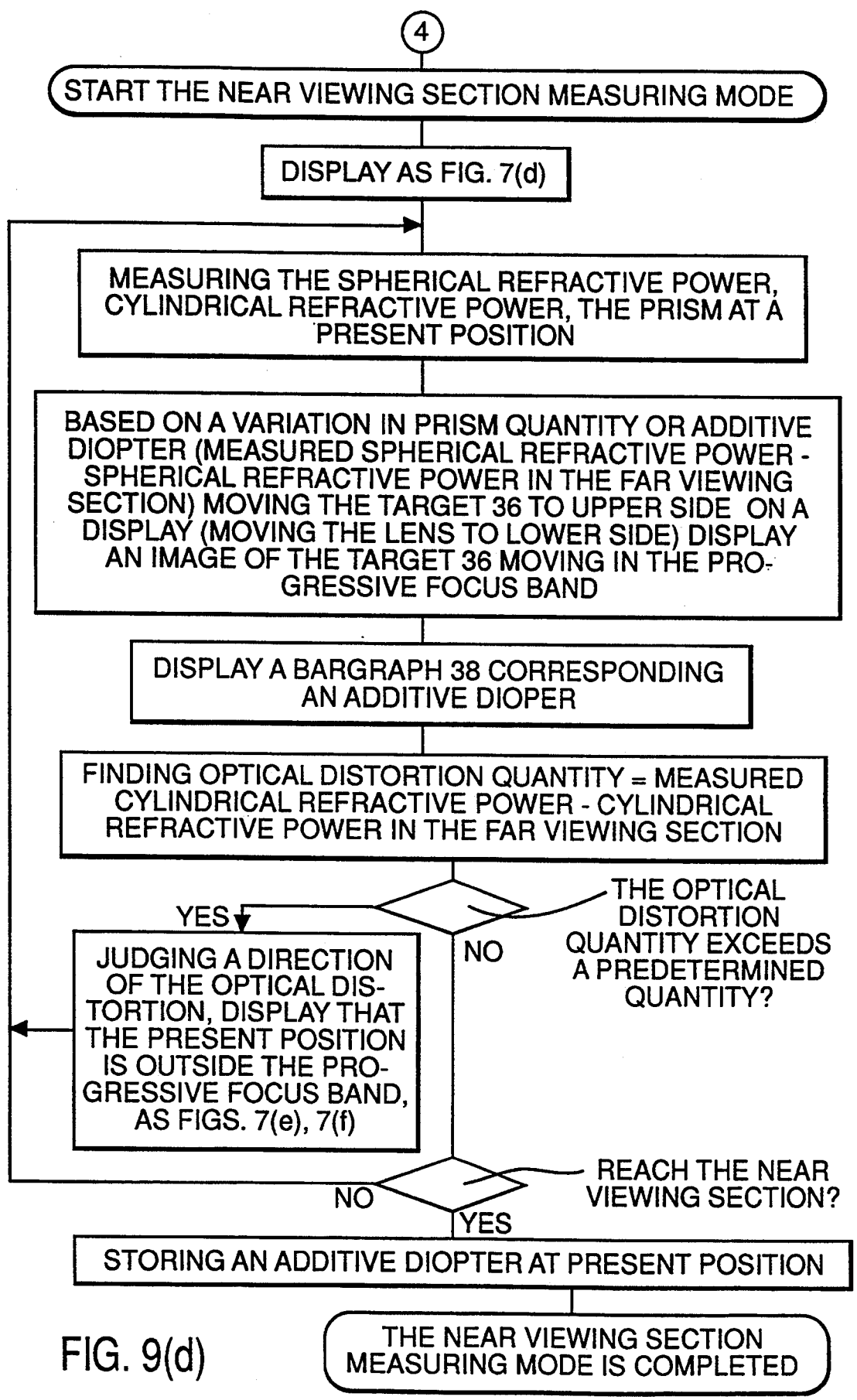
Figure 9E:
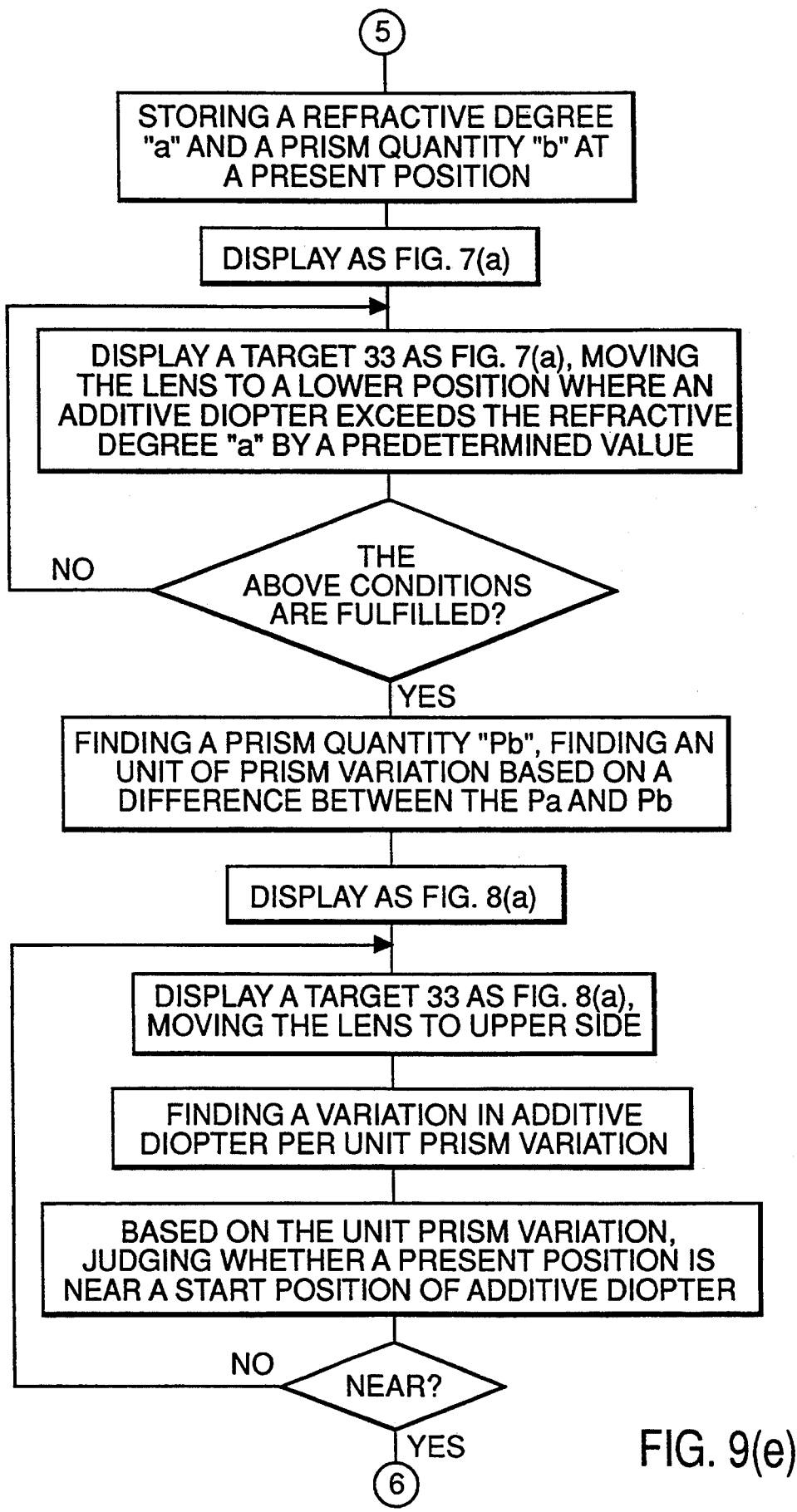
Figure 9F:
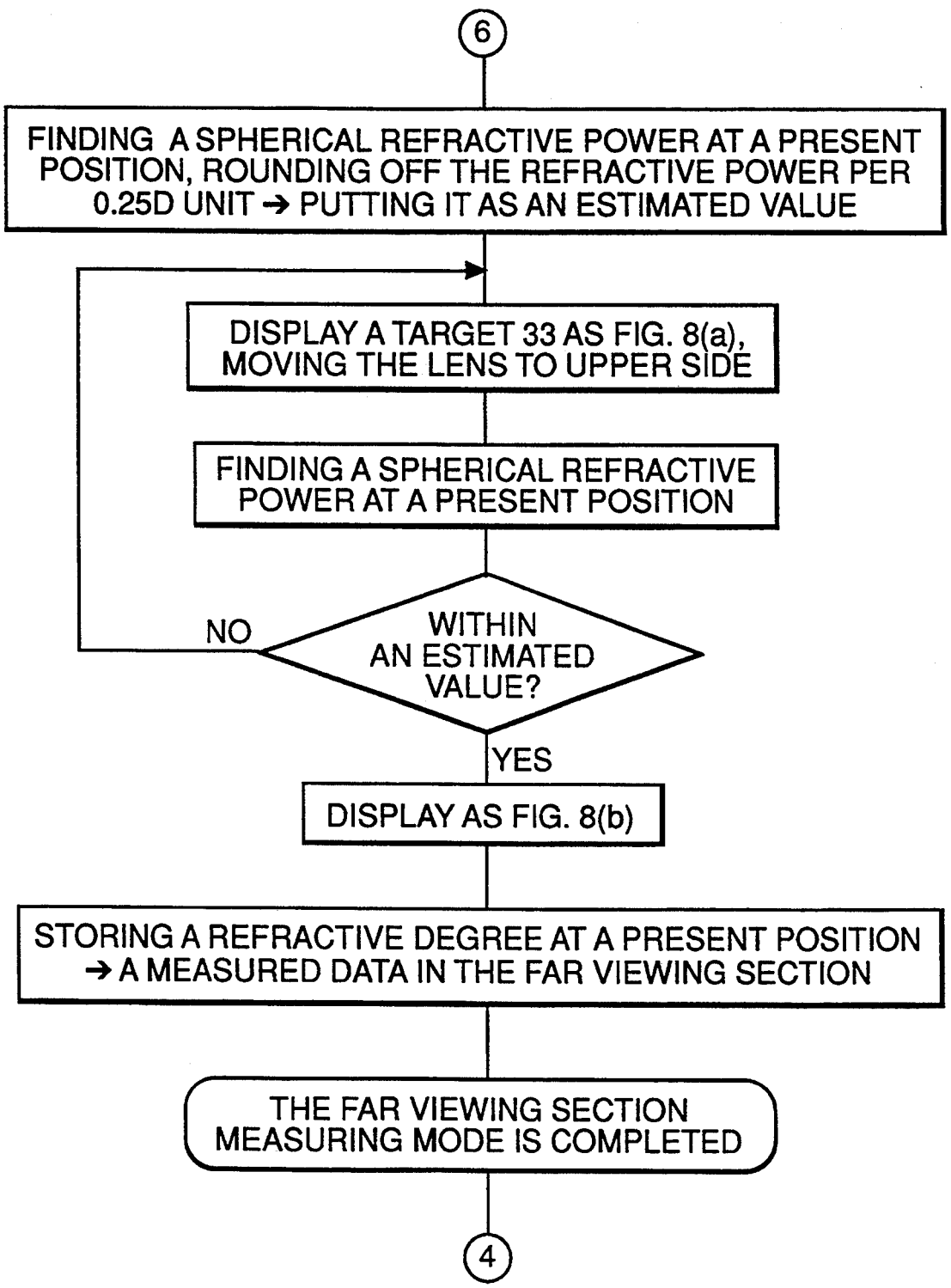

When a measuring position where the additive diopter variation is less than a predetermined reference value, 0.03 D/mm in this embodiment, is judged to be outside progressive focus section, and the measuring point is, after moved by about 2 mm from the measured position, detected to be in the far viewing section, the marker 32 is changed to a cross marker 35, referring to FIG. 8(b). A stable measured data at the measuring point in the far. viewing section is detected by and stored in the microcomputer 25. And then a near viewing section measuring step starts automatically, same as the above (A-1).

A case (B) in which the measuring point is judged to be near the far viewing section of the low power lens will be explained as follows. The basic measuring step in this case is the same as in the non-low power lens of a case (A) mentioned above, so the difference in the process will be described selectively.

A position at x=0 and a display position of the target are detected by offsetting $p^{xo}$ from $P^x$ in a similar way to the above (A) process. In a low power lens, a measuring precision of a refractive power of far viewing section is hardly affected by a slight dislocation from the standard longitudinal axis, but may easily be seriously influenced by errors of processing precision on manufacture. Therefore, differently from the (A) process, if $S+C\sin^2\theta$ as the X component is less than 0.75 D, the moving sensitivity of the target is lowered.

Instead of the method for lowering the moving sensitivity of a target, it is also able to utilize a position where the prism value is near "0" and become the minimum based on variation in cylindrical value, as that on the standard longitudinal axis.

Then, if $S+C\cos^2\theta$ exceeds 0.75 D, the next step returns to (A) step to repeat the additive diopter measuring procedure, conversely if $S+C\cos^2\theta$ is less than 0.75 D, the next step is as follows.

The lens is moved by the operator so as to adjust the target 31 to the marker 32, referring to FIG. 6(c). Then data "a" representing a refractive power and prism quantity Pa at the position where the target 31 is superposed on the marker 32 on the display 1 are stored in a memory. At agreement with the marker 32, the target 31 is replaced with a lateral rectangular target 33 displayed below the marker 32 as shown in FIG. 7(a). Thereby, the measuring point is shifted to lower side of the lens to search a point where an additive diopter exceeds a refractive power "a" by a predetermined degree. When the point is detected, a difference between a measured prism quantity Pb at the measured point and the prism quantity Pa is found to determine a unit quantity of variation in prism.

Next, the target 33 is displayed above the marker 32. The lens is moved so that the target 33 is moved toward the marker 32 to shift the measuring point to the upper side of the lens. Sequence measurement is taken during the lens moving, based on measured data, a variation in refractive power of the lens compared with a variation in prism quantity is calculated, and then a variation in additive diopter per unit prism variation quantity is found.

In low power lens, the additive diopter per unit prism variation quantity is regarded as an index to determine the far viewing section, because the low power lens will be seriously affected by errors in measurement, it is therefore not useful to measure a variation in additive diopter per unit movement quantity as same as (A) step.

Incidentally, a prism variation is little at a slight variation in refractive power, therefore, a measuring point may not reach to the far viewing section in the method for dividing the steps and judging whether it is far viewing section. An additive diopter near the starting point of additive diopter, on the lens design, increases gradually at the rate of increase, not at a linear function rate.

On the distinguishing characteristic of variations in additive diopter, it is judged whether the measured position is sufficiently near the additive diopter starting point, based on a variation in additive diopter per unit prism variation. The additive diopter remains slightly at the measured position, and the refractive power step of progressive focus lens is predetermined at 0.25 D step as mentioned above. The refractive power of far viewing section of the lens may be estimated to be a value rounded off by 0.25 D unit to a minus direction from a refractive degree at the measured position accordingly; if the refractive power diopter is +0.35 D, the additive diopter of the far viewing section is estimated at +0.25 D.

If an estimated value of the refractive power of the far viewing section is found, the measuring point is further shifted toward the far viewing section. When the measuring point is at a position where a value difference between each refractive power at each measuring point and the estimated value become within a predetermined reference value ($\pm 0.06$ D in the present embodiment), the marker 32 is changed to a cross marker 35, as shown in FIG. 7(c), to indicate that the measured position is in the far viewing section. Then, the refractive power of the far viewing section is stored in a memory.

Subsequently, the measurement step in the far viewing section is automatically converted into the near viewing section measurement step. The measurement operation in the near viewing section is almost similar to that in (A) step, but if the y-component of the measured refractive power is less than 0.75 D, the movement distance of the target is determined by an increased quantity in additive diopter.

The above method for finding the far viewing section in the low power lens may be utilized in a general lens, also in a special lens of which refractive power in the far viewing section is irregular.

The above described measuring operation is also shown in FIG. 9(a) through FIG. 9(f) showing flow charts explaining a series of steps of an additive diopter measuring procedure.

The second embodiment of the present invention will be described hereinafter, referring to FIGS. 10 and 11. In the second embodiment, compared with the first embodiment, a position detecting system for positioning the lens and detecting the position of the lens is further provided with a lens meter, and the display position of the target 33 is determined based on data detected through the lens position detecting system. The refractive power measuring system, similar to the first embodiment, is omitted in this embodiment.

Figure 10:
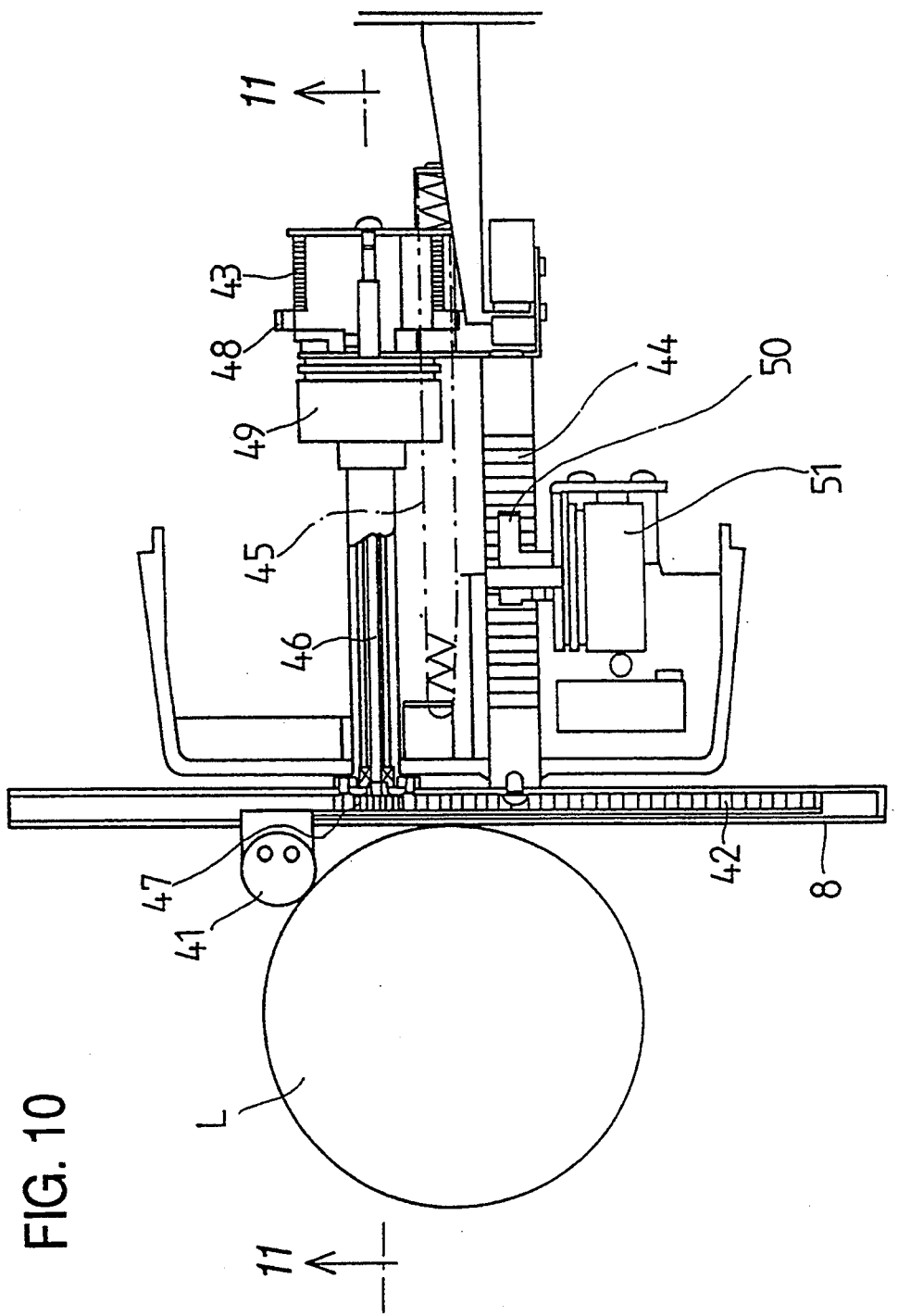
FIG. 10 is a plan view of a position detecting system included in the lens meter of FIG. 1.
Figure 11:
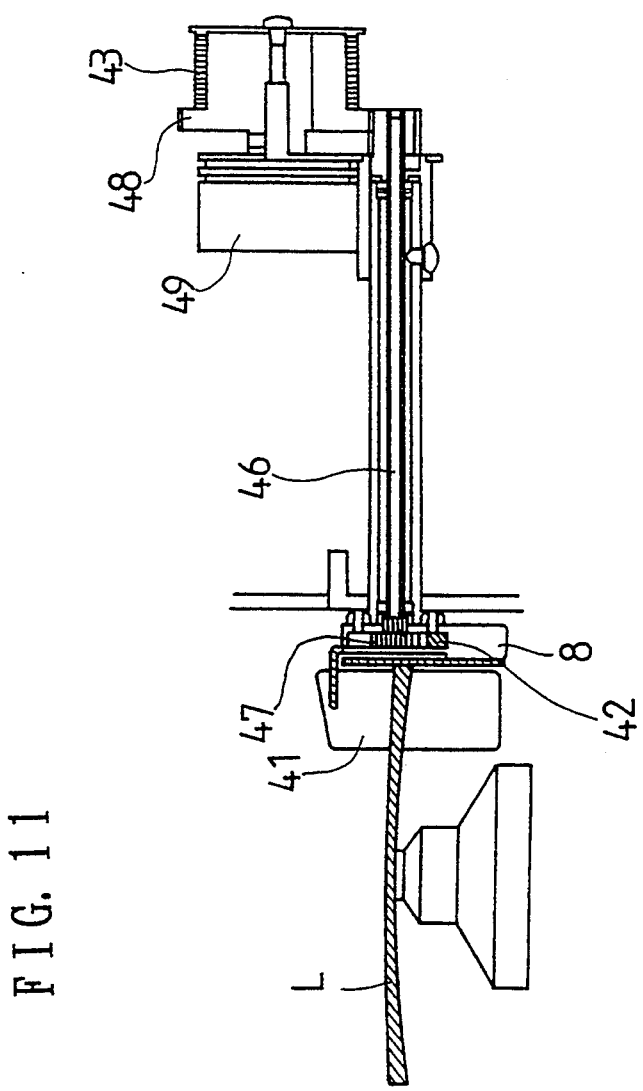
FIG. 11 is a sectional view taken on line 11—11 in FIG. 10.
Figure 12:
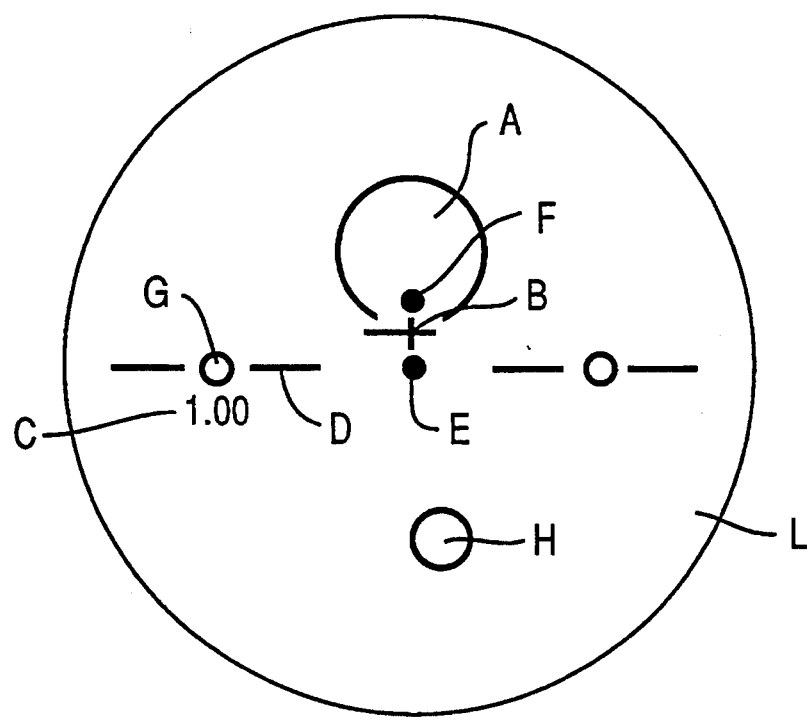
FIG. 12 is a plan view of showing each indicating position of a lens mark and others.
Figure 13A:
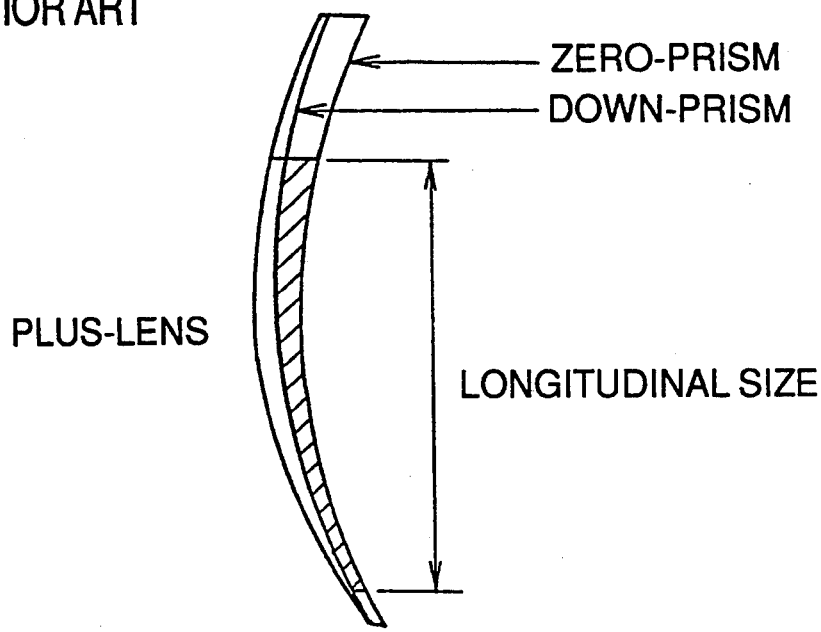
FIG. 13(a) and FIG. 13(b) are schematic sectional views of explaining prism thinning process respectively to a plus-lens and a minus-lens.
Figure 13B:
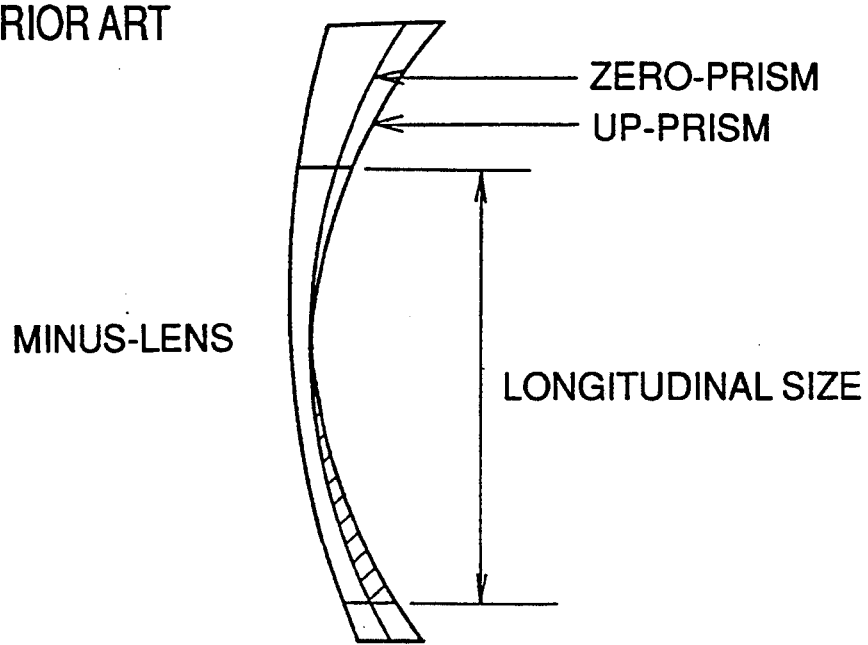

Referring to FIGS. 10 and 11, a rack 42 is supported in a horizontal position within a positioning plate 8 for lateral movement and a guide pin 41 is fixed to the rack 42. The positioning plate 8 is for supporting a framed lens, particularly only a lens in FIG. 10. The guide pin 41 is biased toward the left, as viewed in FIG. 11, by coil springs 43. The positioning plate 8 is fixed to a rack 42 supported for longitudinal movement and biased continuously toward the front by a spring 45. A pinion 47 fixedly mounted on one end of a rotating shaft 46 engages the rack 44 and is moved longitudinally together with the rack 42 by the rack 44. A gear 48 is mounted fixedly on the other end of the rotating shaft 46. The revolution of the gear 48 is detected by a potentiometer 49 to detect the distance of lateral movement of the guide pin 41. The revolution of a pinion 50 engaging the rack 44 is detected by a potentiometer 51 to detect the distance of longitudinal movement of the positioning plate 8. The lens L is held in contact with the positioning plate 8 and the guide pin 41, so that the distance of longitudinal movement and that of lateral movement of the lens L can be detected through the detection of the revolution of the gear 48 and that of the pinion 50. Based on the detected data, each display position of the target and marker is determined.

In the first embodiment, a display position of the target is determined by reducing a variation in prism quantity into a movement distance of the lens (the measuring point), or by utilizing a variation in additive diopter per unit prism variation, instead of that per unit movement distance, to avoid the influence by errors in measurement. On the other hand, in the second embodiment, the movement distance of the lens can be directly detected, so that the detected data may be utilized for determining a display position of the target.

Compared with the first embodiment, the movement distance of the lens can be more precisely detected by employing the apparatus of the second embodiment. It is therefore possible to judge accurately a dislocation direction of the measuring point when the measuring point is outside the progressive focus section, and also to move the target according to the movement distance of the lens, particularly useful to measure a cylindrical lens. It is also possible to find the additive diopter accurately since a position of the near viewing section may be precisely determined by displaying a distance from the far viewing section.

The present invention may be embodied in other specific forms without departing from the spirit or essential characteristics thereof. For instance, it is possible to display only a relation between a target and a marker on a display without two curves imitating a progressive focus section (band), and to move a progressive focus section (band) toward a target.

Each step in the above embodiments may be partially omitted to simplify the operation. For instance, in a measuring mode of a refractive power of far viewing section, an operation to find a starting position of additive diopter may be omitted for an operator who can measure the far viewing section if found a position of a standard longitudinal axis of a lens. If unnecessary to see variations in additive diopter of the progressive focus section on sifting to a measurement of the near viewing section, it is possible to move the lens directly toward near the viewing section.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter including a measuring optical system for determining the optical characteristics of a lens on the basis of the locus of measuring light projected on the lens, transmitted through the lens and detected by a photo-detecting device, said lens meter comprising:

a display means for displaying the relation to adjust the lens to an optical axis of the measuring optical system;

a measuring mode selector means for selecting a measuring made from a single focus lens measuring mode to a progressive focus lens measuring mode;

a control means for measuring a progressive focus lens at position measuring points at predetermined intervals on the lens successively on a measuring optical axis and measuring the refractive power of the lens at each position measuring point;

a calculating means for calculating a dislocation between a vertical standard line and a measuring optical axis of said measuring optical system based on a prism power of the refractive power in a direction of a horizontal standard line of the progressive focus lens, in which the vertical standard line contains a measuring point of the refractive power of a far viewing section, crosses a horizontal standard line, and passes through a geometrical center of the progressive focus lens; and a movement conducting mark displayed on said display means to conduct the measuring to the vertical standard line direction based on data obtained through said calculating means.

2. A lens meter including a measuring optical system for determining the optical characteristics of a leans on the basis of the locus of measuring light projected on the lens, transmitted through the lens and detected by a photo-detecting device, said lens meter comprising:

a display means for displaying the relation to adjust the lens to an optical axis of the measuring optical system;

a measuring mode selector means for selecting a measuring mode from a single focus lens measuring mode to a progressive focus lens measuring mode;

a control means for measuring a progressive focus lens at position measuring points distributed at predetermined intervals on the lens successively on a measuring optical axis and measuring the refractive power of the lens at each position measuring point;

a first detecting means for detecting a measuring area of the refractive power of a far viewing section of the progressive focus lens based on a prism power of the power;

a memory means for storing measured data representing the refractive power in the measuring area of the far viewing section of the progressive focus lens; and a calculating means for calculating the difference between a spherical refractive power of the far viewing section of the lens and a spherical refractive power at each position measuring point on the lens, based on a signal for completion to store the data of the refractive power.

3. A lens meter according to claim 2, wherein said first detecting means comprises a calculating means for calculating a dislocation between a vertical standard line and a measuring optical axis of said measuring optical system based on the prism power of the refractive power in a direction of a horizontal standard line of the progressive focus lens, in which the vertical standard line contains a measuring point of the refractive power of the far viewing section, crosses a horizontal standard line, and passes through geometrical center of the progressive focus lens; and a display circuit for displaying a movement direction on said display means based on data obtained by said calculating means.

4. A lens meter according to claim 3, wherein said first detecting means further comprises a second detecting means for detecting a starting position of an additive diopter in the far viewing section through a variation in spherical refractive power at each successive position measuring point, and a movement index displayed on said display means to conduct a position measuring point from said starting position of the additive diopter to the upper side of the lens.

5. A lens meter according to claim 2, wherein said first detecting means further comprises a judging means for judging whether the position measuring point is in a progressive focus section or in the far viewing section, namely, the far viewing section if the difference between a spherical refractive power at a predetermined reference position and the spherical refractive power at each position measuring point is within a predetermined reference range, the progressive focus section if the difference is outside the predetermined reference range.

6. A lens meter according to claim 5, wherein said first detecting means further comprises a progressive focus section detecting means for detecting, if the judging means judges that an optical measured point is near the far viewing section, whether the optical measured point enters in the progressive focus section based on the variation in additive diopter according to movement of the lens.

7. A lens meter including a measuring optical system for determining the optical characteristics of a lens on the basis of the locus of measuring light projected on the lens, transmitted through the lens and detected by a photo-detecting device, said lens meter comprising:
 a display means for displaying the relation to adjust the lens to an optical axis of the measuring optical system;
 measuring mode selector means for selecting a measuring mode from a single focus lens measuring mode to a progressive focus lens measuring mode;
 a control means for measuring the lens at position measuring points distributed at predetermined intervals on the lens successively on a measuring optical axis and measuring the refractive power of the lens at each position measuring point;
 a first movement conducting mark displayed on said display means to find, based on the refractive power of a progressive focus lens at each measured position, a dislocation in a horizontal direction between a vertical standard line and a measuring optical axis of said measuring optical system and to conduct the measuring point to near the vertical standard line, the vertical standard line containing a measuring position of the refractive power of the far viewing section, crossing a horizontal standard line on a progressive focus lens, and passing through a geometrical center of the horizontal standard line;
 a second movement conducting mark displayed on said display means to conduct the measuring position on a progressive focus band along the vertical standard line, the measuring position having been conducted to near the vertical standard line by the first movement conducting mark; and
 an estimating means for estimating the refractive power of the far viewing section or of a near viewing section of the lens based on the variation in additive diopter of the progressive focus section measured successively during movement of the second movement conducting mark.

8. A lens meter according to claim 7, further comprising a judging means for judging whether the progressive focus lens has a predetermined standard refractive power, and an instruction means for instructing said estimating means to work if the judging means judges that the progressive focus lens has a refractive power less than the predetermined standard refractive power.

9. A lens meter comprising:
 a measuring optical system through which measuring light to measure the optical characteristics of a lens passes;
 an optical measurement position detecting means for detecting the measuring light passing through the lens;
 an optical characteristic calculating means for finding the optical characteristics of the lens based on a detected signal obtained from said optical measurement position detecting means;
 a display means for displaying optical characteristics information of the lens found by said optical characteristics calculating means;
 a mode selector means for selecting a measurement mode between a single focus lens measurement mode and a progressive multifocal lens measurement mode;
 a low power lens judging means for judging, when the progressive multifocal lens measurement mode is selected and thereby a far viewing section measuring step starts, whether the lens is a low power lens based on the optical characteristics found by said optical characteristics calculating means;
 a first determining means for determining the far viewing section based on a variation in an additive diopter per unit movement distance in a vertical standard direction, if the judging means judges that the lens is not a low power lens; and
 a second determining means for determining the far viewing section based on a variation in an additive diopter per unit prism variation in the vertical standard direction, if the judging means judges that the lens is a low power lens.

10. A lens meter according to claim 9, further comprising
 a judging means for judging whether an optical distortion exceeds a standard reference value, the optical distortion being found from a difference between a cylindrical refractive power of the optical measuring point and a cylindrical refractive power of the far viewing section, including an optical characteristic value calculated by said optical characteristic calculating means at the start of a near viewing section measuring step; and
 a measured value omitting/cancelling means for cancelling a measured value for which the judging means judges that the optical distortion exceeds the standard reference value.

11. A lens meter according to claim 9, wherein the second determining means further comprises a refractive power estimating means for estimating the refractive power of the far viewing section of the lens, based on a variation in the additive diopter in a progressive focus band of the lens; and
 a far viewing section detecting means for detecting whether a measured point is in the far viewing section, and comparing the refractive power at the measuring point on the lens and the refractive power estimated by the refractive power estimating means.

12. A lens meter according to claim 9, wherein
 said measuring optical system comprises a measuring light source comprising a plurality of light emitting diodes disposed in a plane perpendicular to an optical axis of said measuring optical system and a measuring target plate through which the measuring light emitted from the light source travels,
 said optical measurement position detecting means comprises an image sensor on which is focused a target image of a target formed on the target plate through which the measuring light travels, and
 said optical characteristic calculating means calculates the optical characteristics of the lens on the basis of coordinates of respective centers of the target images formed by focusing measuring light emitted by the light emitting diodes and having travelled through said target plate onto said image sensor.

13. A lens meter according to claim 12, wherein said optical characteristic calculating means comprises a calculating system for calculating a spherical refractive power, a cylindrical refractive power, an axis angle, and a prism value.

14. A lens meter according to claim 9, wherein said display means comprises a display system for displaying curves imitating progressive focus band and a target showing an optical measuring point on the lens at a progressive multifocal lens measuring mode.

15. A lens meter including a measuring optical system for determining the optical characteristics of a lens on the basis of the locus of measuring light projected on the lens, transmitted through the lens and detected by a photo-detecting device, said lens meter comprising:

a display means for displaying the relation to adjust the lens to an optical axis of the measuring optical system;

a measuring mode selector means for selecting a measuring made from a single focus lens measuring mode to a progressive focus lens measuring mode;

a control means for measuring the lens at position measuring points distributed at predetermined intervals on the lens successively on a measuring optical axis and measuring the refractive power of the lens at each position measuring point;

a lens moving means for moving a progressive focus lens on a plane vertical to the optical axis of said measuring optical system;

a movement distance detecting means for detecting a movement distance of the lens to be moved by the lens moving means;

a calculating means for calculating a variation in additive diopter per unit movement distance based on the movement distance detected by said movement distance detecting means and the measured refractive power; and a far viewing section determining means for determining a far viewing section based on the calculated data from said calculating means.

16. A lens meter according to claim 15, wherein said lens moving means comprises a first moving means for moving said progressive focus lens along a vertical standard line direction, and a second moving means for moving the progressive focus lens along a horizontal standard line direction, said movement distance detecting means comprises detecting means for detecting each movement distance produced by said first moving means, whereby the movement distance of the progressive focus lens is detected based on signals from the detecting means.

* * * * *